UNITED STATES PATENT OFFICE.

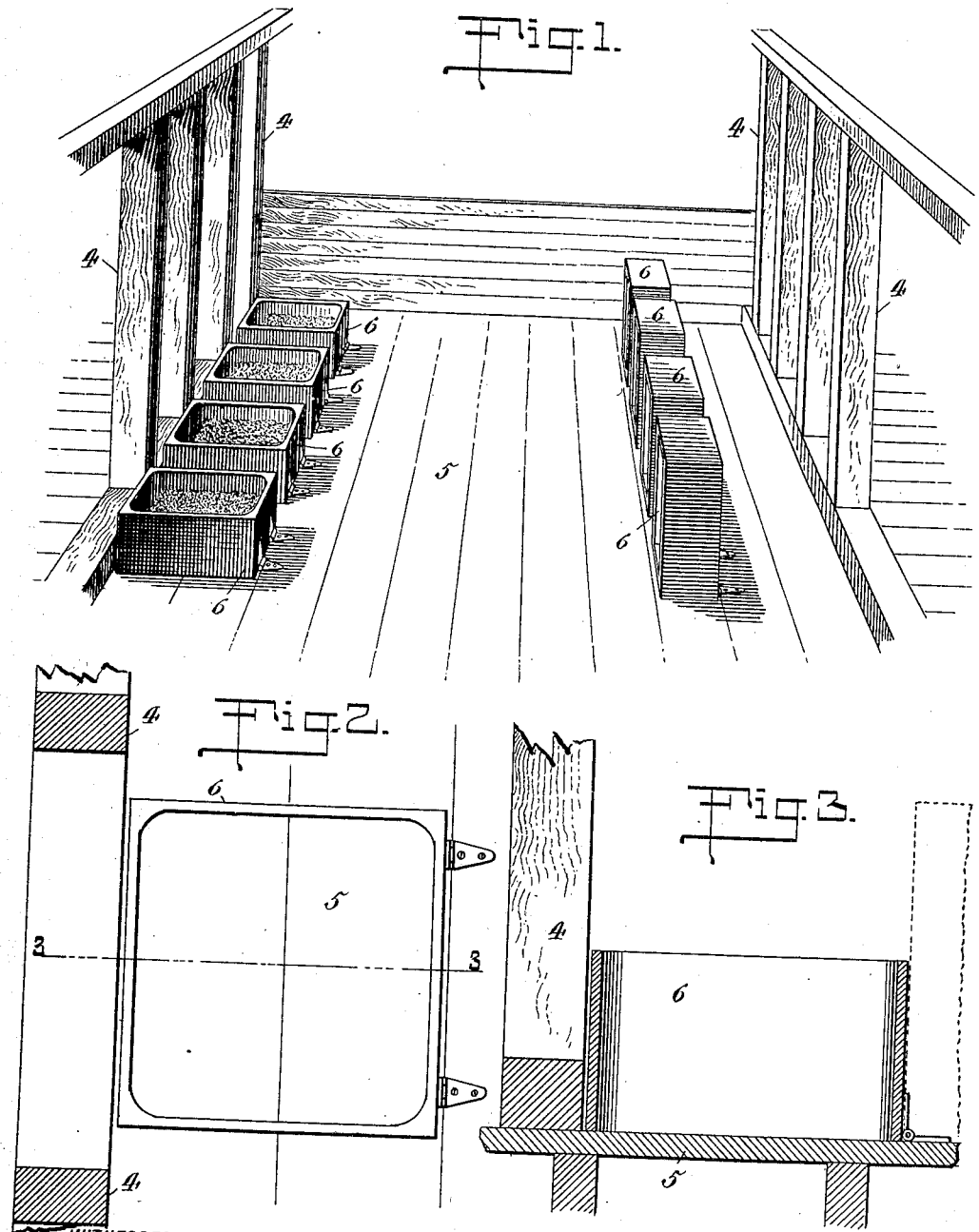

JACOB E. THOMPSON, OF WESTWOOD, NEW JERSEY.

COMBINED FEED-BOX AND MANGER.

No. 913,175.　　　　Specification of Letters Patent.　　　Patented Feb. 23, 1909.

Application filed April 20, 1908. Serial No. 428,008.

*To all whom it may concern:*

Be it known that I, JACOB E. THOMPSON, a citizen of the United States, and a resident of Westwood, in the county of Bergen and State of New Jersey, have made and invented certain new and useful Improvements in a Combined Feed-Box and Manger, of which the following is a specification.

My invention relates to an improved feed box and manger, and more particularly to that kind or type wherein the box may be used in one position as a feed box, and which is capable of being swung or tilted into another position to form part of a manger, the object of the invention being to provide a structure of this kind which will be thoroughly and entirely sanitary, in that it may be perfectly cleaned, the floor of the manger being employed as the floor of the box or boxes when the latter are in use as feed boxes, which latter when raised to form a manger wall, permit of the thorough brushing, scrubbing or sweeping of the floor of all refuse or dirt remaining thereon after the cattle have finished feeding.

A further object of the invention is to provide a structure of this kind which will be cheap and economical, and capable of being installed by unskilled labor in any and all types of barns or stables wherein a manger is used.

With these and other ends in view, the invention consists in certain novel features of construction and combinations of parts, as will be hereinafter fully described and pointed out in the claim.

In the accompanying drawings, Figure 1 is a perspective view of two opposing rows of stalls, separated by an aisle, and in front of which stalls are shown on the left, the boxes in their lowered positions to be used as feed boxes, and on the right or opposite side, in their raised positions to form part of the manger. Fig. 2 is a plan view of one of the boxes in its lowered or feeding position. Fig. 3 is a sectional view taken on the line 3—3 of Fig. 2.

Referring to the drawings, 4 represents the posts or stanchions located at the front or head of a row of stalls, and constructed and arranged in any suitable way to allow of the protrusion of the heads of the cattle between the same, this frame-work being secured to the floor 5. In the aisle, and in front of the stanchions 4, and to the floor 5, are hinged the boxes 6 made of any suitable dimensions and of any suitable material, either wood or metal, preferably cast iron, the boxes being so located that when in their lowered positions, as shown in Figs. 2 and 3, and at the left in Fig. 1, the rear side of each box will fit close to the stanchions 4, in order to be easily and conveniently reached by the cattle when feeding. Each of these boxes consists of four sides, the corners on the inner side being preferably rounded to avoid the lodgment or accumulation of any feed or grain therein. When in their lowered positions to be used as feed boxes, the floor 5 forms the bottom of each box, and when tilted or swung into their raised positions, the floor 5 forms the bottom or floor of the manger, the raised boxes forming the front of a manger, and the stanchions the rear. As the front side of each box is hinged to the floor, it is impossible for the cattle to raise the same when lowered, and also impossible for the cattle to push or force them forward or out of position when raised to form the manger.

It will be understood from the foregoing that after the cattle have finished feeding from the boxes when the latter are in their lowered positions, the boxes may then be raised, thereby permitting the floor to be thoroughly swept, brushed or scrubbed of all refuse or dirt, thereby rendering the structure at all times perfectly sanitary. Furthermore, the invention is applicable to any and all types of stables and capable of being installed therein at a nominal cost.

I am aware that it is not broadly new to employ feed boxes in front of stanchions, whereby to utilize said boxes in one position as feed boxes, and in another position as a part of the manger, but so far as I am aware, such devices are open to all the objections of the ordinary feed box, in that they are not sanitary. I am not aware, however, that any structure has heretofore been devised wherein the bottom or floor of the manger forms the bottom or floor of the feed boxes when the latter are in the lowered positions, whereby said boxes and manger may be kept in a thoroughly cleansed and sanitary condition, and therefore:

Having fully described my invention, what I claim as new and desire to secure by Letters Patent, is:—

A combined feed box and manger comprising stanchions secured to the floor, a frame located in front of and in proximity to said stanchions and consisting of four sides only, the front side of said frame being hinged to the floor, whereby when said frame is raised, it, with said floor and stanchions forms a manger, and when lowered, it, with said floor forms the feed box, the floor of said manger forming the bottom of the box, substantially as described.

Signed at Allendale in the county of Bergen and State of New Jersey this 16th day of April, A. D. 1908.

JACOB E. THOMPSON.

Witnesses:
E. J. COOK,
GEORGE E. COOK.